(12) United States Patent
Pisharody et al.

(10) Patent No.: US 9,137,680 B2
(45) Date of Patent: Sep. 15, 2015

(54) LOCATIONING USING DIFFERENTIAL PHASE MEASUREMENTS OF IEEE 802.11 PREAMBLES

(71) Applicant: SYMBOL TECHNOLOGIES, INC., Lincolnshire, IL (US)

(72) Inventors: Mohanan Pisharody, San Jose, CA (US); John Kramer, Los Gatos, CA (US)

(73) Assignee: Symbol Technologies, LLC, Holtsville, NY (US)

( * ) Notice: Subject to any disclaimer, the term of this patent is extended or adjusted under 35 U.S.C. 154(b) by 526 days.

(21) Appl. No.: 13/644,243

(22) Filed: Oct. 3, 2012

(65) Prior Publication Data

US 2014/0092759 A1   Apr. 3, 2014

(51) Int. Cl.
| | |
|---|---|
| *H04L 12/801* | (2013.01) |
| *H04L 12/26* | (2006.01) |
| *G01S 1/02* | (2010.01) |
| *G01S 5/02* | (2010.01) |
| *G01S 5/14* | (2006.01) |
| *H04W 24/00* | (2009.01) |
| *H04W 64/00* | (2009.01) |
| *G01S 5/00* | (2006.01) |

(52) U.S. Cl.
CPC .................. *H04W 24/00* (2013.01); *G01S 5/00* (2013.01); *H04W 64/00* (2013.01)

(58) Field of Classification Search
CPC ........... H04L 47/10; H04L 43/50; G01S 1/02; G01S 5/02; G01S 5/14; G01S 5/021
USPC ................................. 342/450, 464; 370/252
See application file for complete search history.

(56) References Cited

U.S. PATENT DOCUMENTS

| | | | |
|---|---|---|---|
| 6,310,576 B1 | 10/2001 | Johnson | |
| 2004/0108954 A1* | 6/2004 | Richley et al. | 342/387 |
| 2009/0079633 A1* | 3/2009 | Ward | 342/387 |

FOREIGN PATENT DOCUMENTS

WO    2007064058    6/2007

OTHER PUBLICATIONS

"Timing Characteristics of a Synchronous Ethernet Equipment Slave Clock" Telecommunication Standardization Sector of International Telecommunication Union, Jul. 2010.

* cited by examiner

*Primary Examiner* — Ronald B Abelson
(74) *Attorney, Agent, or Firm* — Brian M. Mancini

(57) ABSTRACT

A method and apparatus for locationing using differential phase measurements of IEEE 802.11 preambles. A first step includes providing a local clock at the same frequency as the IEEE 802.11 preambles. This step includes synchronizing the local clocks at multiple receivers with a reference clock, for example, using Synchronous Ethernet. A next step includes receiving IEEE 802.11 packets from a transmitter by at least three fixed receivers. A next step includes determining a phase offset between the local clock and any nearest cycle of a preamble in the received packets in each of the receivers. A next step includes locating the transmitter using each of the phase offsets.

15 Claims, 3 Drawing Sheets

LOCATIONING USING DIFFERENTIAL PHASE MEASUREMENTS OF IEEE 802.11 PREAMBLES

FIELD OF THE DISCLOSURE

The present invention relates to wireless communication networks, and in particular, to a mechanism for locationing using differential phase measurements of IEEE 802.11 preambles.

BACKGROUND

The use of wireless communications is expanding. Although wireless communications are most commonly used in wide-area environments (e.g. cellular), the use of wireless communication is greatly expanding in local area indoor environments, such as a retail environment, a factory environment, a warehouse environment, etc. In addition, such wireless local area network (WLAN) communications can use a variety of different services, using different frequency bands and communication protocols, e.g. Bluetooth™, IEEE 802.11 or Wi-Fi™, etc.

Within such indoor environments it is desirable to locate objects therein wirelessly using one of these communication networks. For example, in a retail environment it may be desirable to locate a customer for directed advertising, or in a warehouse it may be desirable to locate employees for performing a specific task.

One technique to provide locationing is to utilize Global Positioning System (GPS) receivers. However, such a solution is quite expensive, and is not practical for smaller networks, such as in a home or work environment. Moreover, such networks are usually installed indoors, where GPS receivers may not work properly.

Another technique to provide locationing is to utilize the timing of communication signals received by different receivers within the environment. For example, by examining the TDOA (Time Difference of Arrival) of signals from a transmitter by various receiving points, trilateration techniques to locate a mobile device. However, working out the exact arrival time of a wireless packet to nanosecond accuracy is difficult. Such techniques require precision timing measurements and infrastructure, with highly stable clocks and synchronization between receivers, which may not be available or may be cost prohibitive for smaller home/work environments.

Thus, there exists a need in the field of the present invention to provide sufficient locationing accuracy while being less demanding of clock stability and synchronization between different receivers.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
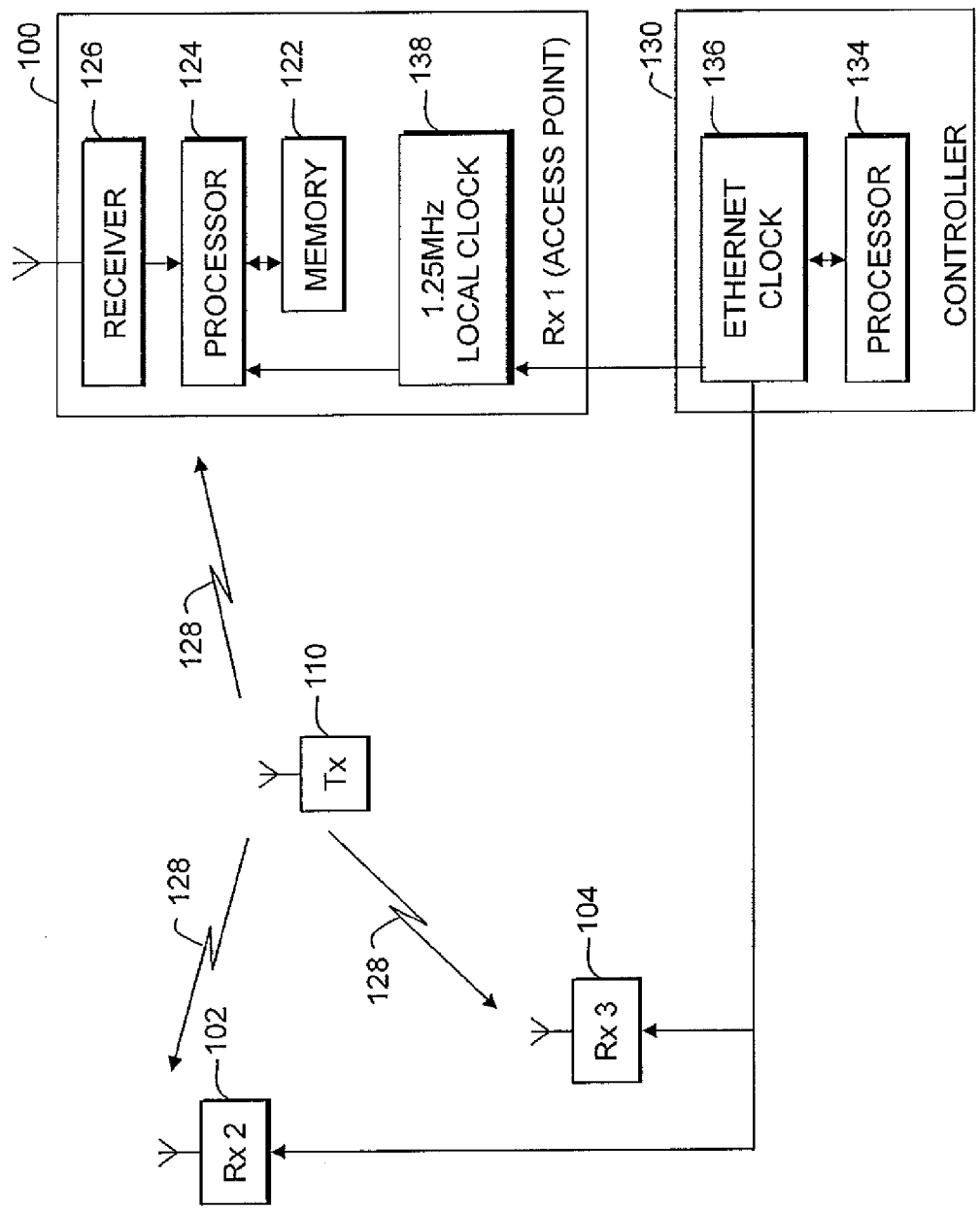
FIG. 1 shows an overview block diagram of a wireless local area network, in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a framework wherein fixed access points on an IEEE 802.11 network can be used to locate a mobile device within the indoor environment of the network without the highly stable clocks and synchronization usually required for TDOA locationing. In particular, the present invention utilizes the 1.25 MHz preamble cycles (also called the Short Training Sequence at the leading edge of the packet) that are present in IEEE 802.11 OFDM (Wi-Fi) packets. By measuring the phase offset of any nearest cycle of the preamble against a local clock (also at 1.25 MHz) at various receivers (access points) of known locations, the position of the transmitting mobile device can be determined.

The present invention has applicability for wireless local area networks (WLAN), but is also relevant for other communication systems. As described herein, an access point can include any one of: an access port, a femto-cell base station, home base station, home (enhanced) Node B, and the like. Although the present invention is described herein in terms of WLAN architectures (IEEE 802.11 and variants thereof), it should be recognized that the present invention can be applied to the combination of any one or more of other wireless technologies such as, but are not limited to: RF; IrDA (infrared); Bluetooth; ZigBee (and other variants of the IEEE 802.15 protocol); IEEE 802.11 (any variation); IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

In general, the receivers (WLAN access points) are configured to provide communication between a wireless switch and mobile devices. For example, the wireless switch can connect a call from the mobile device to a wired Ethernet connection to other entities on the Internet. In an exemplary embodiment, the WLAN access point may also include, without limitation one or more of: a processor, a communication module, memory, and at least one antenna. The elements of the WLAN access point may be interconnected together using a communication bus or another suitable interconnection arrangement that facilitates communication between the various elements of WLAN access point.

The communication module of the access point includes components enabling the access point to communicate on a wired or wireless network. For example, the communication module may include a wired Ethernet interface to communicate information a central server or controller. It should be appreciated that the description herein the WLAN access point is described in an oversimplified manner and a practical embodiment can include additional components and suitably configured processing logic to support known or conventional operating features that are not described in detail herein for the sake of brevity.

Processors may be any microprocessor, application specific integrated circuit, field programmable gate array, digital signal processor, any suitable programmable logic device, discrete gate or transistor logic, discrete hardware components, or combinations thereof that has the computing power capable of managing the WLAN access point and controller. The processor generally provides the software, firmware, processing logic, and/or other components of the controller or WLAN access point that enable their functionality.

A memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor. The memory may be utilized to store data associated with mobile devices, WLAN addressing, etc.

The practical problems of providing an accurate time reference have been a historic problem for locationing systems. For example, TDOA systems either require accurate synchronized clocks at each receiver or separate network infrastructure that can provide a calibrated clock signal to each receiver. The present invention takes advantage of the fact that at 1.25 MHz one wavelength is on the order of 240 meters. Therefore, it is not necessary that signals must be correlated absolutely in time, but need only be correlated relatively, to the nearest cycle of the local clock. Having a 1.25 MHz clock distributed via a separate parallel network wired infrastructure, or via a separate wireless network infrastructure is not very practical. However, synchronous Ethernet IEEE (SyncE) technology can be used to derive a 1.25 MHz clock locally, thus providing a potential way to provide a suitable global phase reference while not requiring the installation of a parallel and separate network infrastructure clock. Synchronous Ethernet (SyncE) is a physical layer technology that can deliver a frequency reference for clock synchronization in packet based networks, such as IEEE 802.11.

FIG. 1 illustrates a block diagram of an IEEE 802.11 wireless local area network (WLAN) adapted to support the inventive concepts of the preferred embodiments of the present invention. A plurality of (at least three) spatially-separated IEEE 802.11 receivers (Access Points or APs) 100, 102, 104 are deployed at fixed, known locations in the WLAN. It is envisioned that the access points are deployed within an indoor environment, such as a warehouse, factory, office, or retail environment with the distance between nearest-neighbor APs restricted to be less than one wavelength of a preamble cycle (approximately 240 meters at 1.25 MHz). The receivers are connected to a central network controller 130, such as a wireless switch, router, server, or other network entity. The controller can be connected to the access points by a wired or wireless connection. A wired Ethernet connection is shown in the example of FIG. 1. The access points are able to communicate with a transmitter 110 (e.g. a mobile device). The transmitter and receivers are operable using an IEEE 802.11 protocol in one embodiment. IEEE 802.11 communicates with packets 128 that include a preamble that consists of a repeating pattern at a 1.25 MHz frequency, i.e. one cycle equals 0.8 µs. Due to the different distances between the transmitter and various receivers, the preamble will arrive at the receivers with different phase offsets when compared against the local phase generated at all APs.

As known in the art, each access point typically includes receiver front-end circuitry 126 (effectively providing reception, filtering and intermediate or base-band frequency conversion) that is able to receive signals from a mobile device 110, whether that mobile device is currently associated with this AP or not. The receiver circuitry 126 is coupled to a processor 124, which can include a digital signal processing function. Each access point can also include its own transmitter circuitry (not shown for the sake of simplicity). The receiver front-end circuitry 126 comprises frequency down-conversion functions, as are known in the art. The access point can also include a memory 122 for storing information and measurements. The access point also includes a local 1.25 MHz clock generator 138 that is synchronized with the globally distributed reference clock (via Synchronous Ethernet).

Of course, the various components within each receiver can be arranged in any suitable functional topology able to utilize the inventive concepts of the present invention. Furthermore, the various components within the access point can be realized in discrete or integrated component form, with an ultimate structure therefore being merely based on general design considerations. It is within the contemplation of the invention that the operating requirements of the present invention can be implemented in software, firmware or hardware, with the function being implemented in a software processor (or indeed a digital signal processor (DSP)) being merely a preferred option.

In a specific embodiment, the present invention relates to wireless local area networking, wherein access points provide local coverage to fixed and mobile devices. The access points 100, 102, 104 communicate with a central controller 130. In the example shown, this communication is performed over an Ethernet connection to an Ethernet interface 136 in the controller that is controlled by a processor 134.

In accordance with the present invention, typical receive processing proceeds as follows. Each receiver 100, 102, 104 continuously down-converts the RF signal packets 128 at an antenna input to a baseband signal which is then digitized and passed along to a (DSP) digital signal processor (e.g. processor 124). The DSP looks for the 1.25 MHz periodic pattern of the preamble in the data stream before starting to decode the rest of the frame from the baseband signal. In accordance with the present invention, each receiver adds a parallel processing path, where the local clock with the same 1.25 MHz frequency is continuously digitized and fed to the DSP, such as from the local clock 138 which is synchronized with the Ethernet clock 136. When a preamble is detected in the data stream, a waveform from time correlated local clock (e.g. 138) is also simultaneously available to the DSP and the phase offset between any two nearest cycles of the two can be readily computed.

Figure 2:
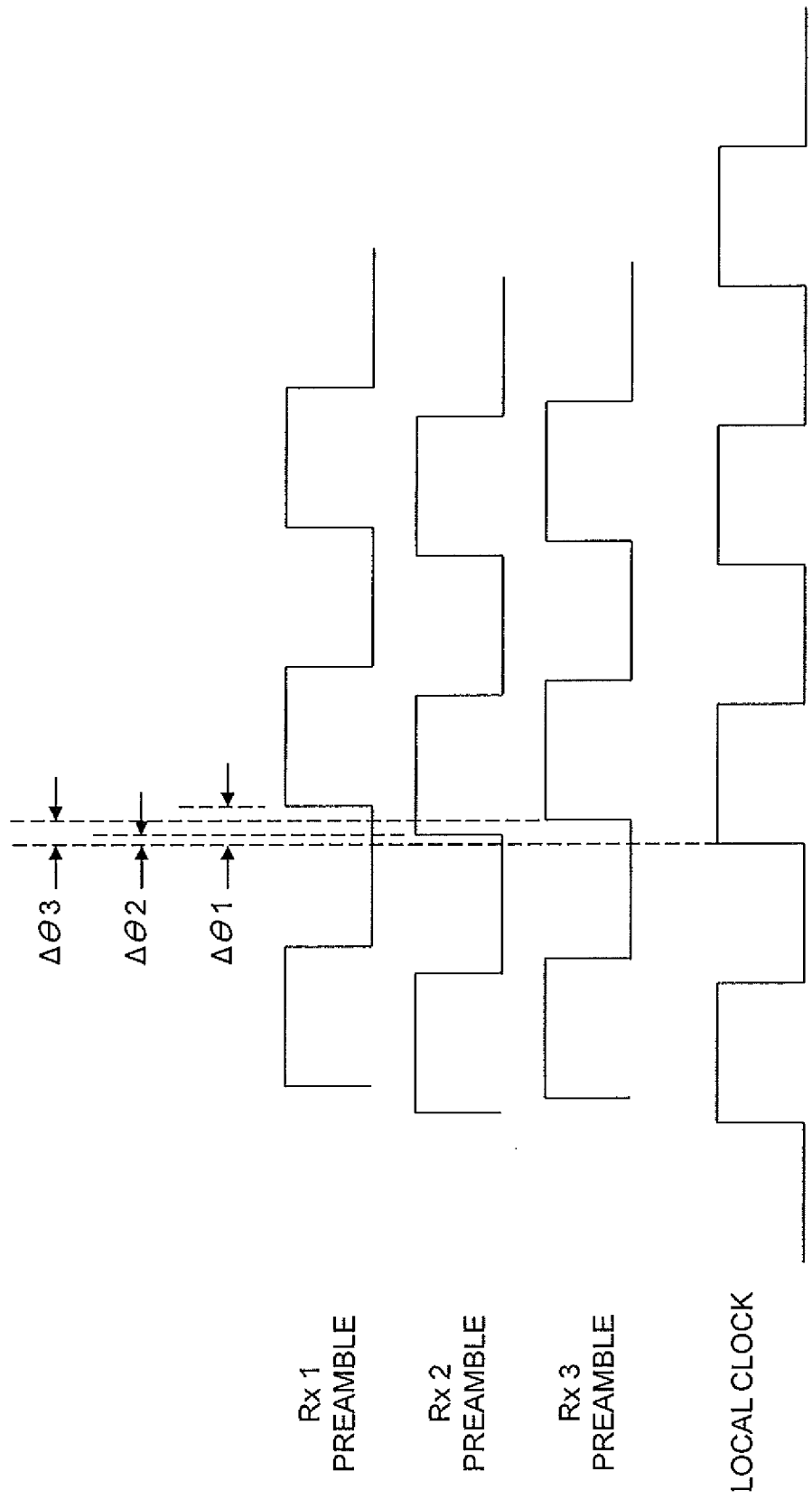
FIG. 2 shows a diagram that illustrates the phase offsets that can exist in a local area network.

In the simplest analysis, assuming that the phase of the local clock generator of each of the receivers is identical and the transmitter is located equidistant to all three receivers, then the phase offset between the preamble and the local clock will be the same at all three receivers. However, as the transmitter moves away from the equidistant point, the phase offsets (Δ) at each receiver will no longer be equal, as shown in FIGS. 1 and 2. The difference between the phase offsets of any two receivers will be directly proportional to the difference in distances from the transmitter to each of the two receivers. This relationship can be used to determine the location of the transmitter, using techniques known in the art. For example, this phase relationship is fully captured by the equation for a hyperbola with foci at the receivers and the difference in distance from the transmitter to each focus being the difference in phase offsets (converted to distance). A set of hyperbolas can be drawn by considering receivers in pairs, with the caveat that the two receivers in each of the selected pairs cannot be separated by more than one wavelength of the preamble (240 meters). The intersection of these curves will be the location of the transmitter. Similarly, trilateration techniques, and the like can be used to determine a location of the transmitter.

As shown in FIGS. 1 and 2, the transmitter 110 is closest to Rx 2 102, next closest to Rx 3 104, and farthest from Rx 1 100, which results in the least phase offset (Δ2) between the local clock and the preamble received in Rx 2, more phase offset (Δ3) between the local clock and the preamble received in Rx 3, and the most phase offset (Δ1) between the local clock and the preamble received in Rx 1. The phase offsets at each receiver can be sent to the controller processor 134, over the Ethernet connection for example, where the processor can use these different phase offsets to calculate a location of the transmitter 110 using known locationing techniques.

It may be that the phases of the local clocks are not the same, resulting in additional unknown (but constant) offsets on top of the phase offsets described above. Fortunately, this unknown offset due to cable delays can be calibrated out by using a reference transmitter at a known, measured location. The reference transmitter can periodically send out packets which are received by all APs within range. Since the positions of the transmitter and receivers are known in this case, the relative phase offsets between pairs of AP receivers can be calculated and applied as a correction for the unknown constant offset due to different Ethernet cable lengths.

If the calibration scheme above is implemented, it may be possible to eliminate the external, remote common reference clock wired to all the receivers. A higher stability local 1.25 MHz clock at each receiver can then be frequently calibrated against those in nearby receivers using the reference transmitter technique.

As a further refinement, it may also be possible to up-convert the 1.25 MHz local clock to a carrier channel (e.g. 2.4 or 5 GHz in IEEE 802.11) and feed this into one of the antenna chains of a multiple-input multiple-output receiver, such that only the DSP code in the receiver needs to be modified to do the phase difference calculation. In this case, the hardware in the RF section of the receiver need not be changed.

As used in the present invention, the preamble and the local clock are low frequencies signals of about 1.25 MHz, making phase comparisons easier. In addition, the APs are placed such that the straight-line distance between pairs of nearest-neighbors is always less than one wavelength (240 meters). This guarantees that the phase difference of arrival between two receivers will always be less than one full cycle and can be measured without any ambiguities of integer numbers of whole cycles folded in. Further, the frequency/phase of the local clock needs only be stable to approximately 1270 ppm for a location accuracy of one-foot (one full cycle of phase offset=1 wavelength=240 m=787 feet), which is easily achieved. In addition, since the present invention depends on a "difference of differences" technique on identical access point hardware, imperfections that are common tend to cancel out.

Figure 3:
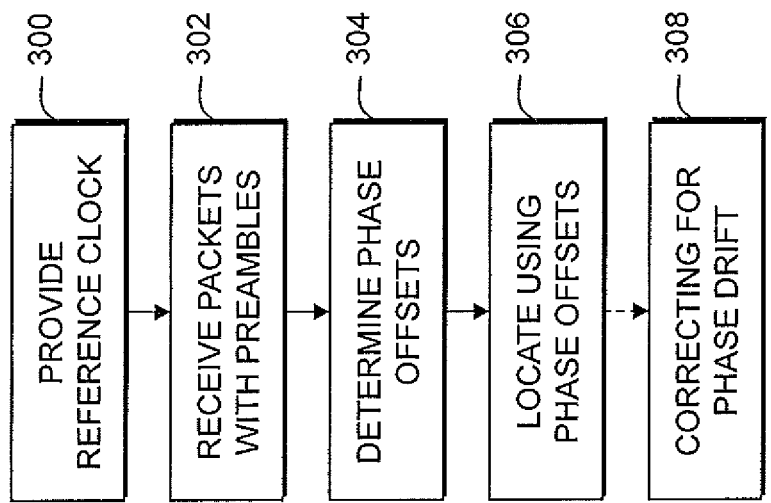
FIG. 3 is a flow chart illustrating a method, in accordance with the present invention.

Referring to FIG. 3, the present invention describes a method for locationing using differential phase measurements of IEEE 802.11 preambles. A first step 300 includes providing, for each receiver of a plurality of receivers, a local clock synchronized with a reference clock at the same cycle frequency as the IEEE 802.11 preambles, e.g. 1.25 MHz. This step includes compensating for the different phases of the local clock generator of each receiver. The reference clock could be local to each receiver. However, the present invention envisions that the reference clock is an external, remote reference clock generator that supplies the local clock to each receiver, which is synchronized thereto. For example, the reference clock could be an external synchronized Ethernet signal supplied to each receiver, or the reference clock could be supplied in an IEEE 802.11 carrier channel. In these latter instances, no local time reference clock is needed in each receiver.

A next step 302 includes receiving IEEE 802.11 packets from a transmitter by at least three fixed receivers. It is envisioned that the receivers are spaced apart less than one wavelength of the 1.25 MHz local clock A next step 304 includes determining a phase offset between the local clock and any nearest cycle of a preamble in the received packets in each of the receivers.

A next step 306 includes locating the transmitter using each of the phase offsets. It is envisioned that the transmitter can be heard by multiple pairs of APs (at least two pairs for a two dimensional position fix), with the APs in each pair separated by less than one wavelength at 1.25 MHz.

An optional step 308 is correcting for phase drift in the receivers by utilizing a transmitter at a known location for sending out packets to the receivers periodically such that relative phase offsets between pairs of receivers are applied as a correction for phase drift. In this case, if the providing step 300 includes local clocks within each receiver, these local clocks can be calibrated by the correction for phase drift.

Advantageously, the present invention needs no local time reference and the phase difference is utilized for locationing. The reference signal is only a frequency reference and the local clock is used for direct phase comparison with a packet preamble. The use of the phase of a preamble provides sufficient accuracy while being less demanding of clock stability and synchronization between different receivers than the normally used TDOA (Time difference of Arrival) and RTT (round trip time) methods.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for locationing using differential phase measurements of IEEE 802.11 preambles, comprising the steps of:
    providing, for each receiver of a plurality of receivers, a local clock synchronized with a reference clock at the same cycle frequency as the IEEE 802.11 preambles, and compensating for the phase differences of each local clock generator of each receiver;
    receiving IEEE 802.11 packets from a transmitter by at least three fixed receivers;
    determining a phase offset between the local clock and any nearest cycle of a preamble in the received packets in each of the receivers; and
    locating the transmitter using each of the phase offsets.

2. The method of claim 1, wherein receiving includes the receivers being spaced apart less than one wavelength of the local clock.

3. The method of claim 1, wherein locating includes the transmitter being heard by at least two pairs of access points being separated by less than one wavelength of the local clock.

4. The method of claim 1, further comprising the step of correcting for phase drift in the receivers by utilizing a transmitter at a known location for sending out packets to the receivers periodically such that relative phase offsets between pairs of receivers are applied as a correction for phase drift.

5. The method of claim 4, wherein providing includes the reference clock being local to each receiver and being calibrated by the correction.

6. The method of claim 1, wherein providing includes the local clock being synchronized to an external Ethernet signal supplied to each receiver.

7. The method of claim 1, wherein providing includes the reference clock being remote from each receiver and supplied in an IEEE 802.11 carrier channel.

8. A system for locationing using differential phase measurements of IEEE 802.11 preambles, comprising:
    a local clock generator operable to provide, for each receiver of a plurality of receivers, a local clock at the same cycle frequency as the IEEE 802.11 preambles;
    a transmitter to be located, the transmitter operable to transmit IEEE 802.11 packets including preambles;
    at least three fixed receivers operable to receive IEEE 802.11 packets from the transmitter, the receivers further operable to determine a phase offset between the local clock and any nearest cycle of a preamble in the received packets; and
    a controller operable to input the phase offsets from each receiver to determine the location of the transmitter.

9. The system of claim 8, wherein the receivers are spaced apart less than one wavelength of the local clock.

10. The system of claim 8, wherein the transmitter to be heard by at least two pairs of access points being separated by less than one wavelength of the local clock.

11. The system of claim 8, wherein the controller is further operable to correct for phase drift in the receivers by utilizing a transmitter at a known location to send out packets to the receivers periodically such that relative phase offsets between pairs of receivers are applied as a correction for phase drift.

12. The system of claim 11, wherein the reference clock is local to each receiver and is calibrated by the correction.

13. The system of claim 8, wherein the reference clock is an external synchronized Ethernet signal supplied to each receiver.

14. The system of claim 8, wherein the reference clock is remote from each receiver and can be supplied in an IEEE 802.11 carrier channel.

15. A system for locationing using differential phase measurements of IEEE 802.11 preambles, comprising:
- an external Ethernet reference clock operable to supply, for each receiver of a plurality of IEEE 802.11 receivers, a reference clock operable to synchronize a local clock at the same 1.25 MHz cycle frequency as the IEEE 802.11 preambles;
- a transmitter to be located, the transmitter operable to transmit IEEE 802.11 packets including preambles;
- at least three fixed IEEE 802.11 receivers operable to receive IEEE 802.11 packets from the transmitter, the receivers further operable to determine a phase offset between the local clock and any nearest cycle of a preamble in the received packets; and
- a controller operable to input the phase offsets from each receiver to determine the location of the transmitter.

\* \* \* \* \*